INVENTOR
RICHARD R. BOWER
BY
ATTORNEY

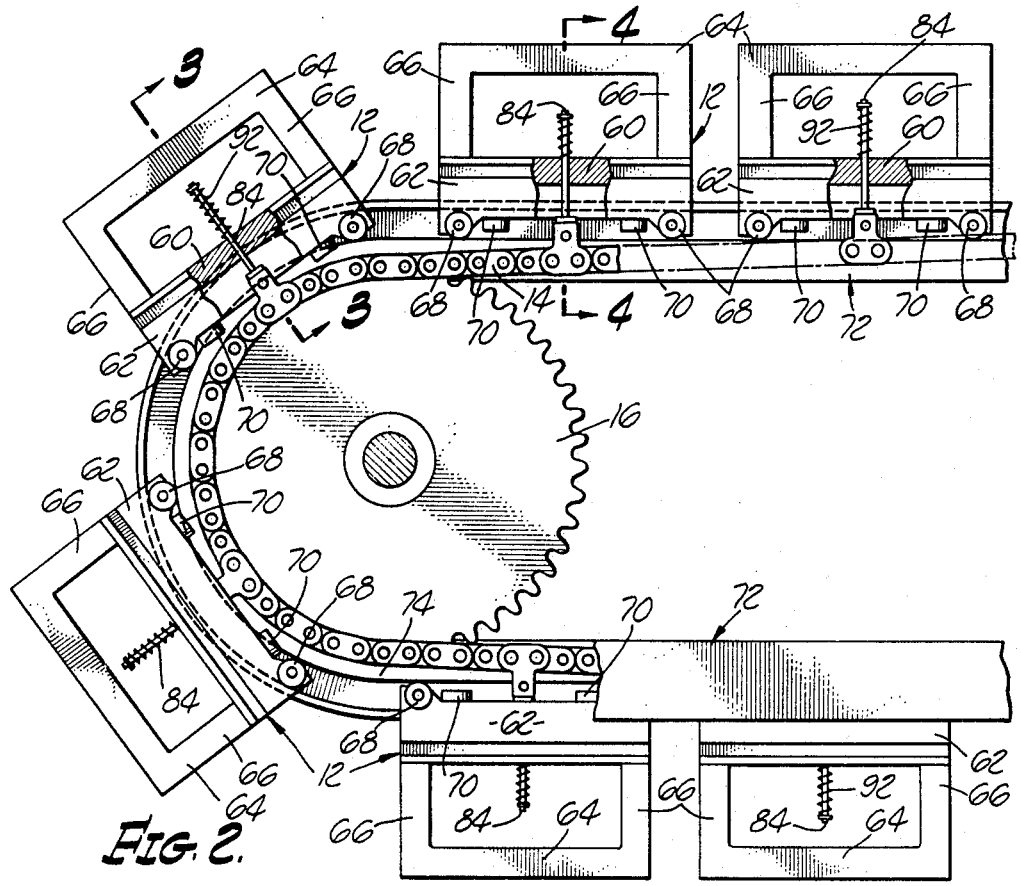
FIG. 2.
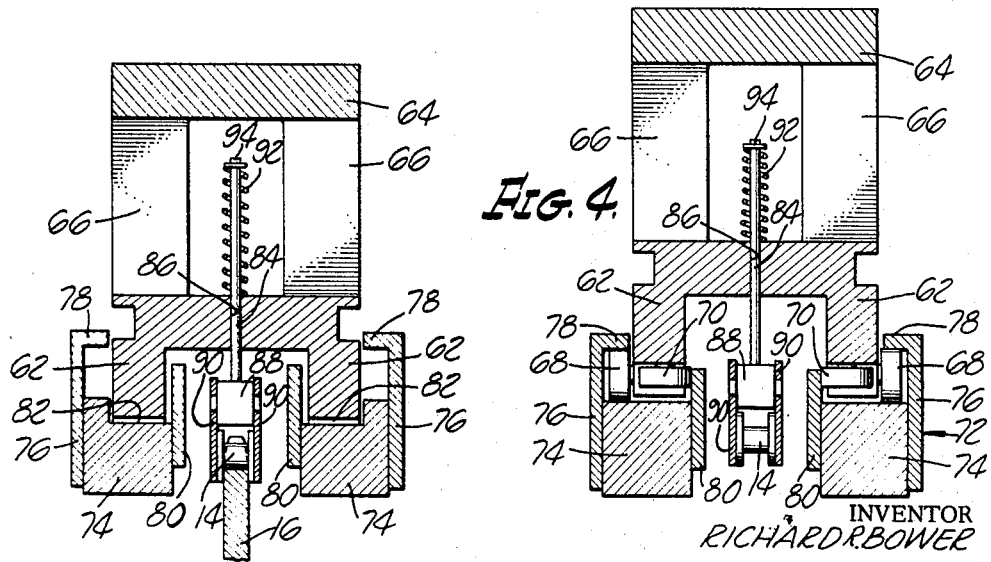
FIG. 3.
FIG. 4.
INVENTOR
RICHARD R. BOWER
BY
ATTORNEY Nov. 4, 1969   R. R. BOWER   3,476,231
ASSEMBLY CONVEYOR SYSTEM
Filed Nov. 21, 1967   3 Sheets-Sheet 3

United States Patent Office 3,476,231
Patented Nov. 4, 1969

3,476,231
ASSEMBLY CONVEYOR SYSTEM
Richard R. Bower, Northridge, Calif., assignor to International Telephone and Telegraph Corporation, New York, N.Y., a corporation of Delaware
Filed Nov. 21, 1967, Ser. No. 684,863
Int. Cl. B23q 7/00
U.S. Cl. 198—19                                    10 Claims

ABSTRACT OF THE DISCLOSURE

Conveyor apparatus for assembling articles wherein a plurality of endless conveyors are arranged in generally parallel relationship with adjacent conveyors moving in opposite directions. The conveyors are synchronously driven and periodically simultaneously stopped at preselected work and transfer stations. Opposing movement of successive adjacent conveyor units allows relatively long overall conveyor length in compact apparatus and periodically brings respective portions of an article on adjacent conveyors into registry for assembly transfer of one such portion onto the other. Spaced carriages on each conveyor hold the workpieces and are individually indexed for accurate positioning at the work and transfer stations.

BACKGROUND OF THE INVENTION

Where a considerable number of separate work steps and assembly operations must be performed in a given sequence in the course of assembly of an article, it is often desirable to move the article from station to station on some form of conveyor apparatus. Typically, a single belt or chain type conveyor will be employed and where a relatively large number of work steps and assembly operations are required the conveyor becomes excessively long and thereby occupies an undesirably large amount of space.

With conventional conveyor systems it is difficult to automate the assembly procedures where a number of relatively small parts must be assembled, and particularly where one or more subassemblies must first be put together, and then subassemblies must be further assembled with other portions of the devices or with other subassemblies. In such cases the inadequacies of conventional conveyors usually require a substantial proportion of hand labor in the assembly and transfer steps, making the overall assembly operation generally slow, difficult, tedious and expensive, with a high labor content.

Another problem in connection with conveyor apparatus employed for the assembly of very small parts is that it is difficult to provide sufficiently accurate positioning of such parts on the conveyor in registry with work stations for detail work to be done on the parts within the tolerance specification required, and without damaging delicate parts.

SUMMARY OF THE INVENTION

In view of these and other problems in the art, it is an object of the present invention to provide an improved conveyor system for assembling articles which is capable of accommodating a relatively large number of work steps and assembly operations, yet which is particularly compact, occupying a minimum amount of space.

Another object of the invention is to provide an assembly conveyor system wherein various work steps and subassembly operations are performed on separate portions of an article being assembled while these separate portions are disposed on respective adjacent, generally parallel conveyor units. In accordance with the invention these adjacent conveyor units are arranged to move in opposite directions and are synchronously driven and periodically simultaneously stopped at preselected work and transfer stations. After the respective portions of the article have been treated at the required number of work stations, they are brought into closely adjacent, registered relationship and stopped at a transfer station wherein one of the portions can be removed from its conveyor unit and applied to the other portion on the other conveyor unit with a minimum amount of movement being required.

Another object of the invention is to provide an assembly conveyor system of the character described wherein each of the generally parallel conveyor units of the system comprises an endless conveyor having a plurality of longitudinally spaced work-supporting carriages thereon which ride on fixed track means and are spring-biased against such track means for stability of movement of the carriages. In addition to such stabilization of the carriage movement, a precise carriage-locating mechanism engages each of the carriages at its respective work and transfer stations.

A further object of the invention is to provide a novel assembly conveyor system of the character described which is particularly adapted because of its compactness, precision positioning and closeness of transfer stations, for the assembly of very small parts requiring a number of separate subassembly and assembly steps, and which is for the same reasons particularly well suited for automation of the various work and transfer operations.

Further objects and advantages of the present invention will appear during the course of the following part of the specification, wherein the details of construction and mode of operation of a presently preferred embodiment are described with reference to the accompanying drawings, wherein:

BRIEF DESCRIPTION OF THE DRAWINGS

FIGURE 2 is a fragmentary side elevational view of one of the conveyor units shown in FIGURE 1, with portions broken away and portions shown in section, particularly illustrating the manner in which the conveyor carriages are driven and stabilized in their paths of travel.

FIGURE 3 is an enlarged cross-sectional view taken on the line 3—3 in FIGURE 2.

FIGURE 4 is an enlarged cross-sectional view taken on the line 4—4 in FIGURE 2.

DETAILED DESCRIPTION

Figure 1:
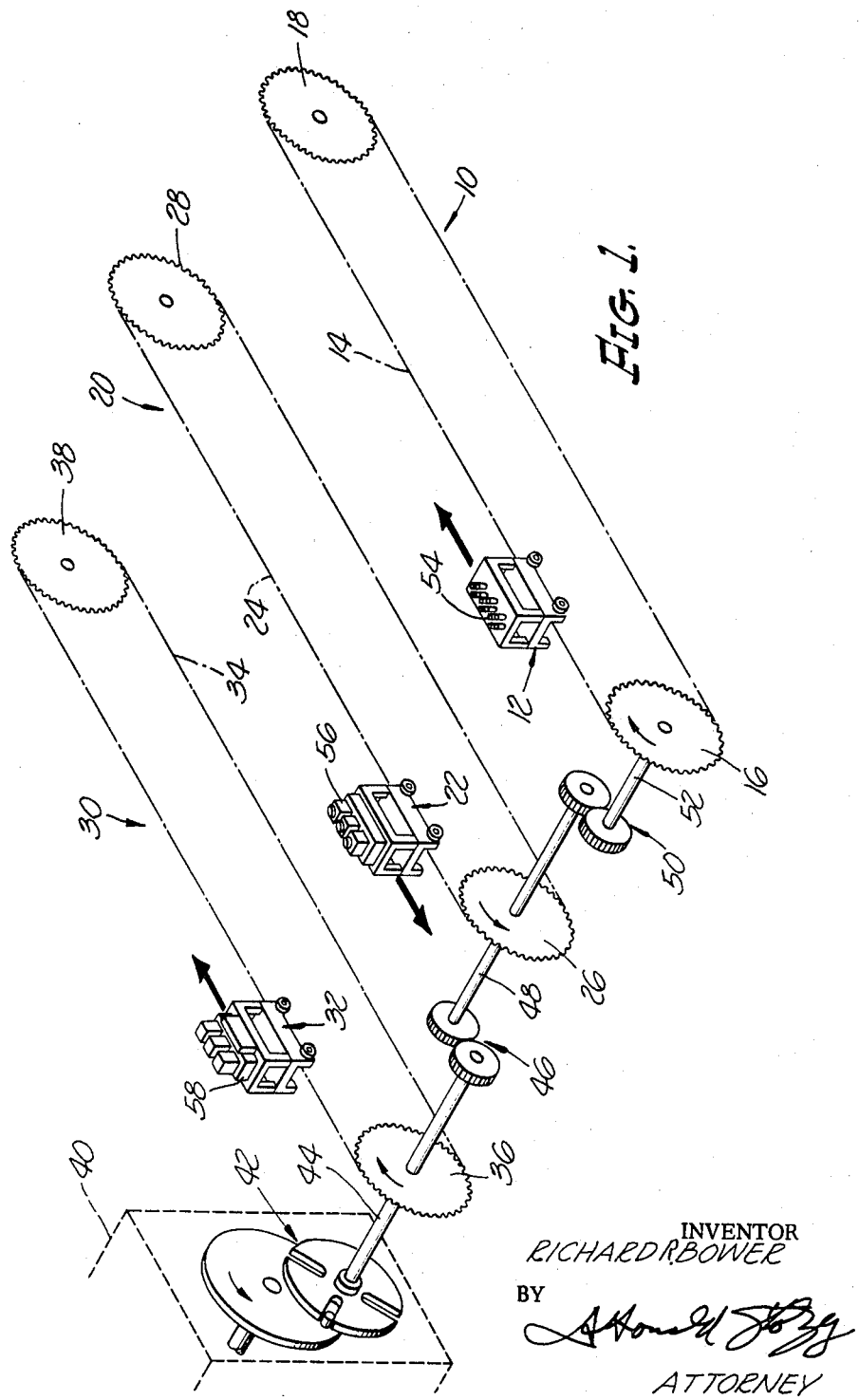
FIGURE 1 is a diagrammatic perspective view of a conveyor system employing three individual conveyor units in accordance with the present invention.

FIGURE 1 of the drawings diagrammatically illustrates an assembly conveyor system according to the present invention which includes three generally parallel conveyor units, a first conveyor unit 10, a second conveyor unit 20 and a third conveyor unit 30. The first conveyor unit 10 comprises a plurality of work-supporting carriages 12, one of which is shown, longitudinally spaced along and driven by a continuous conveyor chain 14 which extends between a drive sprocket 16 at one end and an idler sprocket 18 at its other end.

Similarly, the second conveyor unit 20 comprises a series of carriages 22 which are longitudinally spaced along and driven by an endless chain 24 which is engaged at its opposite ends about a drive sprocket 26 and an idler sprocket 28. The third conveyor unit 30 comprises a series of longitudinally spaced carriages 32 driven by endless chain 34 which is supported on drive sprocket 36 and idler sprocket 38.

The three conveyor units 10, 20 and 30 are synchronously but intermittently driven by a source 40 of rotary power which drives the conveyor units through a Geneva movement 42 and a following series of shafts and gears. The Geneva movement 42 is coordinated with the spacing of the various stations (not shown) along the three conveyor units so that the carriages 54, 56 and 58 of the respective conveyor units 10, 20 and 30 will be periodically simultaneously stopped at preselected work and transfer stations and will remain stopped proximate such stations for sufficient intervals of time to allow precise location of the carriages at the respective stations by locating means described hereinafter in detail, and then to allow time for work or transfer operations to take place.

The drive system from the Geneva movement 42 is diagrammatically illustrated in FIGURE 1, and includes Geneva output shaft 44 which rotates clockwise as viewed in FIGURE 1, and upon which the drive sprocket 36 for the third conveyor unit 30 is mounted; spur gear drive 46 from shaft 44 to a shaft 48 which is driven anticlockwise as viewed in FIGURE 1, and upon which the drive sprocket 26 for the second conveyor unit 20 is mounted; and spur gear drive 50 from shaft 48 to a shaft 52 which rotates clockwise as viewed in FIGURE 1, and upon which the drive sprocket 16 of the first conveyor unit 10 is mounted. Accordingly, as viewed in FIGURE 1, the drive sprocket 16 for the first conveyor unit 10 rotates clockwise so that the carriages 12 exposed at the top of the first conveyor unit move to the right; the drive sprocket 26 of the second conveyor unit 20 moves anticlockwise, so that the exposed carriages 22 move to the left; and the drive sprocket 36 of the third conveyor unit 30 moves clockwise so that the exposed carriages 32 move to the right. Thus, the work-supporting carriages on adjacent conveyor units move in generally parallel paths, but in opposite directions.

With this arrangement, the carriages on each of the conveyor units will stop at a succession of discrete positions for receiving portions of subassemblies of a device to be assembled, for work to be done upon such portions or subassemblies, and for transfer of portions or subassemblies from one conveyor unit to the next conveyor unit. Because of the oppositely directed movement of the carriages in successive conveyor units, the successive conveyor units can be so timed that when the portions or subassemblies of an article on one carriage of one conveyor unit are ready to be transferred to other portions or subassemblies on a carriage on the next conveyor unit, these carriages on the adjacent conveyor units are brought into alignment and stopped at what is referred to herein as a transfer station at which the portions or subassemblies are moved from the carriage on one conveyor unit and engaged with the other portions or subassemblies on the aligned carriage of the next conveyor unit.

For purposes of illustration, and not of limitation, the conveyor system illustrated in FIGURE 1 is shown as being employed for the assembly and packaging of rotatable flash cubes of a type currently in wide usage in connection with flash cameras. The carriages 12 of the first conveyor unit 10 each receive twelve flash bulbs 54 upside down in suitable holders, arranged in three groups of four bulbs each. A portion of these bulbs are deposited on each carriage 12 at one station, and then the remainder of the bulbs are deposited on the carriage 12 at a second station. At a succeeding station wire leads extending upwardly from the bottoms of the bulbs 54 are straightened and a flash cube base member is engaged over the wire leads of each of the three groups of four bulbs. Then at a further station the wire leads are bent over to secure the bases and their corresponding bulbs into subassemblies. The final station of each carriage 12 on the first conveyor unit 10 is a transfer station wherein the carriage 12 is brought into registry or alignment with a carriage 22 on the second conveyor unit 20 which supports three reflector and cover units in upside down positions. These reflector and cover units are deposited in position on the carriage unit 22 at a station which precedes the transfer station. At the transfer station, each of the base-bulb subassemblies is removed from the carriage 12 of the first conveyor unit and deposited into a respective reflector and cover unit on the carriage 22 of the second conveyor unit 20. Then, as the carriage 22 moves to the left along the conveyor unit 20, a succession of welding steps is applied to permanently secure the three plastic bases to the respective three cover units, with the final station on the second conveyor unit 20 comprising a transfer station wherein the carriage 22 with the fully assembled flash cubes 56 is in alignment or registry with a carriage 32 of the third conveyor unit 30 upon which a box 58 has been erected for receiving the three assembled flash cubes 56. This transfer station for the carriage 32 of the third conveyor unit 30 may be preceded by a series of work stations at which the box 58 may be deposited in a flat condition on the carriage 32, the box is erected and the end flaps tucked in. After the flash cubes have been inserted into the box at the transfer station, the carriage 32 may proceed to one or more further stations at which a plastic covering is applied over the flash cubes that are deposited in the box, and a final transfer station at which the completely packaged flash cubes are removed from the carriage 32.

While the three conveyor units 10, 20 and 30 are in generally parallel relationship, they may or may not be generally coextensive longitudinally. This will depend upon the nature of the assembly job being performed, and in particular the longitudinal relationship of each pair of adjacent conveyor units will depend upon the number of stations which must either precede or succeed the transfer station for each conveyor unit. For example, if the last station on conveyor unit 10 is the transfer station at which subassemblies are transferred from a carriage 12 over onto a carriage 22 of the second conveyor unit 20, but the same transfer station for a carriage 22 on the second conveyor unit 20 is the second or third station on the conveyor unit 20, then normally the conveyor unit 20 will be offset longitudinally to the right of the conveyor unit 10 as illustrated in FIGURE 1.

Although the present invention is adaptable for the assembly of devices of any size, it is particularly useful in the assembly of very small parts which require accurate positioning and alignment, and close spacing between the parts. The foregoing example of the assembly and packaging of flash cubes illustrates an assembly operation involving small parts and close tolerances, for which the present assembly conveyor system is particularly useful. Although the work and transfer operations at the various stations can be either automatic or manual, the precision positioning and close spacing permitted by the present invention cause the invention to be particularly well adapted for automated assembly operation.

FIGURES 2, 3 and 4 illustrate details of construction of one of the conveyor units, unit 10, although it is to be understood that conveyor units 20 and 30 may be similarly constructed.

Each of the carriages 12 includes a generally flat, rectangular base portion 60 having a pair of spaced, parallel legs 62 extending downwardly from opposite sides thereof. A holder portion 64 of each carriage is supported above base portion 60 on a plurality of support legs 66. In the illustrations shown in FIGURES 2, 3 and 4, the holder portion 64 is shown as a generally flat, rectangular structure, although it is to be understood that the holder portion 64 may be shaped as required for supporting the parts to be assembled.

Each carriage 12 has four primary guide wheels 68 disposed generally at the four corners of the carriage and extending downwardly from the legs 62. These guide wheels 68 are rotatable on generally horizontal axes. Each carriage 12 also includes four lateral positioning wheels 70 mounted underneath the legs 62 and positioned inwardly of the respective guide wheels 68 both in the lateral direction and in the longitudinal direction. These lateral positioning wheels 70 are rotatable on generally vertical axes, assuming the carriage to be in a generally upright position.

The guide wheels 68 and lateral positioning wheels 70 on the respective sides of the carriage 12 ride in a pair of spaced track members 72, each of which is composed of a main rail member 74, an outer generally vertically oriented plate 76 having an in-turned flange 78 providing an upper rail member, and a generally vertically oriented inner plate 80 providing an inner rail. With this arrangement, the two guide wheels 68 on each side of the carriage 12 will roll and be guided between the respective main rail member 74 and flange 78 of the outer plate 76; while the pair of lateral positioning wheels 70 on each side of the carriage 12 will roll on and be guided by the respective inner plate 80.

The track members 72 are in generally parallel, spaced relationship, and define a continuous path of travel for the carriages 12 which is generally the same as the path of travel of the chain 14. Thus, the chain is disposed along its length within the space defined between the track members 72 as best shown in FIGURES 3 and 4. In the region where the track members 72 curve around each of the sprockets 16 and 18, the main rail members 74 are cut away at 82 to provide room for the central regions of the parallel legs 62 which extend generally as secants relative to the arc of curvature of the track members in these regions. These cut away portions 82 are illustrated in FIGURE 3, which also illustrates the manner in which the sprocket 16 extends into the space between the track members 72.

Each of the carriages 12 is driven with the chain 14 by means of a single drive rod 84 which is attached to the chain and extends upwardly or at right angles to the chain through a bore 86 extending through the center of the base portion 60 of the carriage. The drive rod 84 is attached at its lower end to a block 88 attached to the chain by means of a pair of chain plates 90. The drive rod 84 projects upwardly a substantial distance beyond the base portion 60 of the carriage to receive a helical compression spring 92 thereon, the spring being secured on the rod by a lock ring 94 or other locking means adjacent the upper end of the rod. The combination of a drive rod 84 and compression spring 92 for each of the carriages 12 allows the smooth application of motive power to the carriages even as they move through the arcuate portions of the track adjacent the sprockets where the central regions of the base portions 60 of the carriages are disposed closer to the chain. The biasing of springs 92 serves to hold the guide wheels 68 of each carriage snugly down against the main rail members 74 along the entire length of the tracks for smooth, stable movement of the carriages, and for accurate vertical positioning of the carriages at the various work and transfer stations. The springs 92 additionally serve to tension the chain 14 in the arcuate portions of the chain where it passes over the sprockets so as to take slack out of the chain and thereby stabilize its movement.

Figure 5:
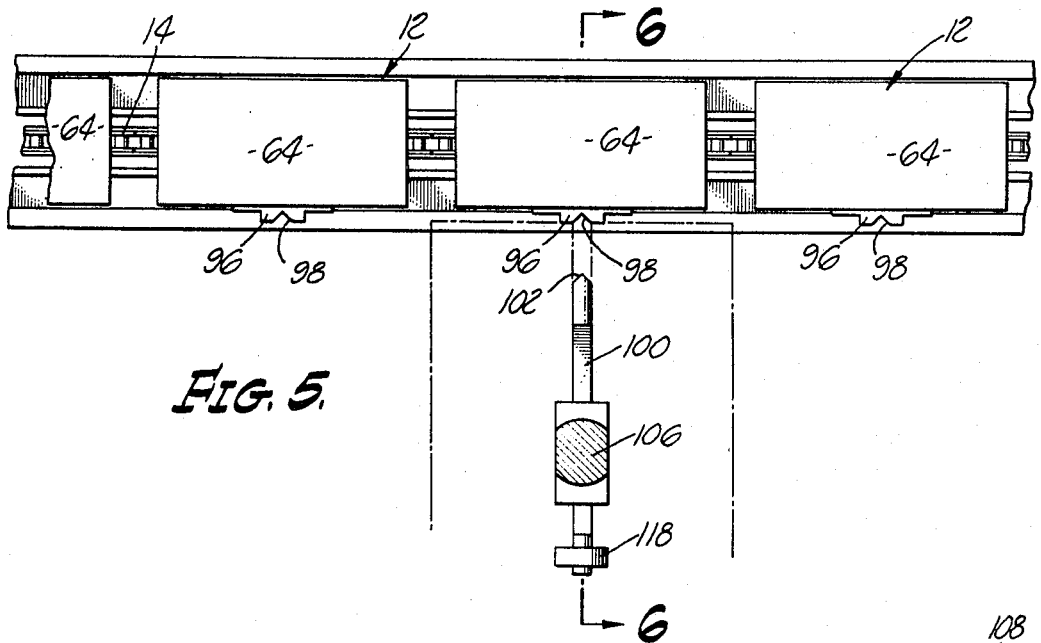
FIGURE 5 is a fragmentary plan view, partly in section, illustrating the locating mechanism for precise indexing of the work-supporting carriages at the various work and transfer stations.
Figure 7:
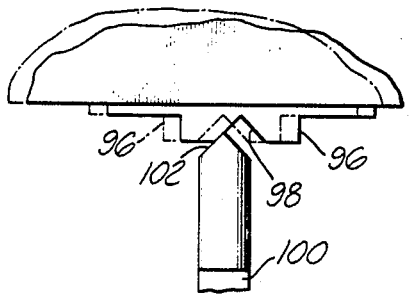
FIGURE 7 is an enlarged, fragmentary plan view illustrating the interengaging portions of the locating mechanism and one of the carriages, the solid line position of the carriage being slightly offset from the precise position for a station, and the phantom line position of the carriage being the precise position for the station.
Figure 6:
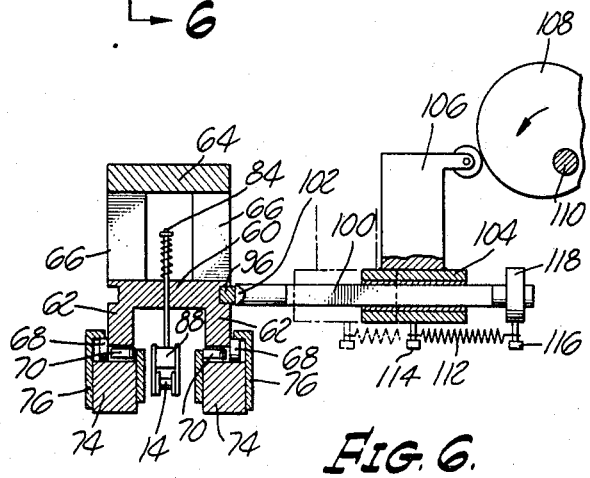
FIGURE 6 is a vertical section taken on the line 6—6 in FIGURE 5 illustrating details of construction of the locating mechanism.

FIGURES 5, 6 and 7 illustrate the locating mechanism for precise longitudinal location of each carriage at any one of the work or transfer stations.

Each of the carriages 12 has a locating fixture 96 mounted on one side thereof, this fixture having a V-shaped notch therein. A locating rod 100 is oriented generally normal to the path of travel of the conveyor unit, the rod 100 having a V-shaped forward end 102 that is generally complementary to the V-shaped notch 98. The locating rod 100 is slidably mounted for reciprocal movement in a bushing 104 for advancing the V-shaped end 102 of the rod into engagement with the V-shaped notch 98 in the carriage fixture when the carriage stops and is to be precisely located, and for retracting the locating rod to release the carriage for further movement thereof along the conveyor after a work or transfer operation has occurred.

The bushing 104 is attached to a cam follower 106 which is driven by a cam 108 in a reciprocating path aligned with the reciprocating path of travel of the locating rod 100, but of somewhat larger magnitude. The cam 108 is mounted on a cam shaft 110 which is driven off of the Geneva movement 42 and preferably is driven by a connection (not shown) from the spur gear drive 50 or the shaft 52 directly related to the first conveyor unit 10 with which the locating apparatus is associated.

A helical tension spring 112 is engaged between a post 114 on the bushing 104 and a post 116 on a collar 118 attached to the locating rod 100. With this arrangement, the spring 112 provides a resilient coupling between the bushing 104 and the locating rod 100 so that when the bushing 104 is advanced toward the carriage 12 it will move the locating rod forwardly until the V-shaped end 102 thereof engages in the V-shaped notch 98 on the carriage. The spring 112 allows a substantial amount of overtravel of the bushing 104 relative to the locating rod 100 after the end 102 of the rod is initially engaged in the notch 98. This overtravel is illustrated in FIGURE 6 by the distance from the solid line positions of bushing 104 and cam follower 106 to the phantom line positions thereof. This overtravel results in a corresponding tensioning of the spring 112 and increase of engaging force between the end 102 of the locating rod and the notch 98 on the carriage, which in turn causes the locating rod 100 to cam the locating fixture 96 on the carriage laterally relative to the axis of the locating rod 100, or longitudinally relative to the conveyor, until the V-shaped end 102 of the rod is in full registry in the V-shaped notch 98 on the locating fixture to precisely position the carriage. FIGURE 7 illustrates this final, precise positioning as the spring 112 is tensioned by the overtravel of bushing 104 and cam follower 106 relative to the locating rod 100. Because of the inevitable slop or play in the conveyor chain 14, when the carriage 12 is stopped by the Geneva movement 42 proximate a station, the carriage will be slightly offset from the exact position of the station. The solid line positioning of the carriage 12 and locating fixture 96 thereon in FIGURE 7 are intended to indicate the positions of these parts when the carriage 12 first stops proximate a station. It will be noted that the V-shaped notch 98 on the locating fixture 96 is offset from the V-shaped end 102 of the locating rod 100. While this amount of offset may be such as to produce serious problems in the work or transfer steps on devices being assembled, nevertheless the rod end 102 will at least partially engage in the notch 98. Since the notch 98 and the end 102 of the locating rod have complementary, vertically oriented inclined surfaces, as the biasing force of spring 112 increases, the locating rod 100 will cam the locating fixture 96 to the left in FIGURE 7 to the phantom line position wherein the V-shaped end 102 of the rod is fully seated in the V-shaped notch 98 of the locating fixture and the carriage 12 is consequently precisely located at its work or transfer station.

The extent of the overtravel of bushing 104 and cam follower 106 relative to the locating rod 100 will normally be sufficient so that the carriage 12 will remain precisely indexed at the station for a sufficient interval of time for the work or transfer operation to be completed before the rod end 102 is retracted from the notch 98 to allow the carriage 12 to proceed to another station.

It is to be understood that locating apparatus similar to that illustrated in FIGURES 5, 6 and 7 may be associated with each of the work and transfer stations on each of the conveyor units 10, 20 and 30. Preferably, a separate cam shaft like the cam shaft 110 will be employed in connection with each of the conveyor units 10, 20 and 30, and the motive power for each of these cam shafts will be from the Geneva movement 42, and can, if desired, be taken off of any of the shafts 44, 48 or 52, or spur gear drives 46 or 50, as is convenient.

While the instant invention has been shown and described herein in what is conceived to be the most practical and preferred embodiment, it is recognized that departures may be made therefrom within the scope of the invention, which is therefore not to be limited to details disclosed herein, but is to be accorded the full scope of the claims so as to embrace any and all equivalent devices.

What is claimed is:

1. An assembly conveyor system comprising a plurality of endless conveyor units arranged in generally parallel relationship and each having a plurality of longitudinally spaced stations adjacent thereto, work supporting means on each conveyor unit, and drive means synchronously dricing the conveyor units so as to move adjacent conveyor units in opposite directions, said drive means including stop means for periodically simultaneously stopping said conveyor units with at least a portion of said work supporting means of each conveyor unit in registry with at least one of the respective stations.

2. Apparatus as defined in claim 1, wherein said stop means comprises a Geneva movement.

3. Apparatus as defined in claim 1, wherein each conveyor unit comprises an elongated, endless, flexible member driven by said drive means, and endless track means arranged generally parallel to and coextensive with said flexible member, said work supporting means on each conveyor unit comprising a plurality of longitudinally spaced carriages engaged with and longitudinally movable along said track means, and a drive connection between said flexible member and each of said carriages.

4. Apparatus as defined in claim 3, wherein said drive connection for each of said carriages comprises a rod attached to and projecting generally normally from said flexible member, said rod being slidably engaged with the respective said carriage, and spring biasing means engaged between said rod and said carriage so as to bias the carriage against the track and tension said flexible member.

5. Apparatus as defined in claim 4, wherein said elongated, endless, flexible member is a chain, and said conveyor unit includes sprocket means about which said chain is looped.

6. Apparatus as defined in claim 5, wherein said track means comprises a pair of spaced, parallel, endless track members disposed on opposite sides of said chain, each of said carriages having a pair of longitudinally spaced guide wheels on each side thereof rollingly engaged against the respective track and rotatable about an axis generally normal to the plane of the chain loop, and each carriage also having a pair of longitudinally spaced lateral positioning wheels on each side thereof rollingly engaged against the respective track and rotatable about an axis generally parallel to the plane of the chain loop.

7. Apparatus as defined in claim 3, which includes locating means proximate at least one of said stations for precise longitudinal positioning of each carriage on the respective conveyor when the carriage is stopped adjacent that station, said locating means comprising a locator reciprocally moved by said drive means between a retracted position spaced from the carriage when the carriage is moving and an extended position engaged with the carriage when the carriage is stopped adjacent that station.

8. Apparatus as defined in claim 7, wherein the carriage and locator have generally complementary, engageable locating surfaces thereon defined by a generally V-shaped notch in one of the members and a generally V-shaped projection on the other member.

9. Apparatus as defined in claim 7, wherein said locator includes a first portion engageable with the carriage and a second portion that is reciprocally moved by said drive means, and a lost-motion spring coupling between said second portion and said first portion, said second portion being reciprocated by said drive means over a greater span of travel than is required to move said first portion into engagement with the carriage, whereby when said second portion is driven toward said extended position said first portion will first be brought into engagement with the carriage, and then further movement of said second portion toward said extended position will cause said spring coupling to bias said first portion against the carriage.

10. Apparatus as defined in claim 9, wherein said second portion comprises a sleeve and said first portion comprises a rod slidably mounted in said sleeve, said spring coupling including a spring engaged between said sleeve and said rod.

References Cited
UNITED STATES PATENTS 426,479   4/1890   Tremaine _____ 198—19 X EDWARD A. SROKA, Primary Examiner U.S. Cl. X.R.

29—203